Oct. 21, 1958     A. S. LOUIS     2,857,496
SEALED POTENTIOMETERS
Filed Sept. 27, 1956
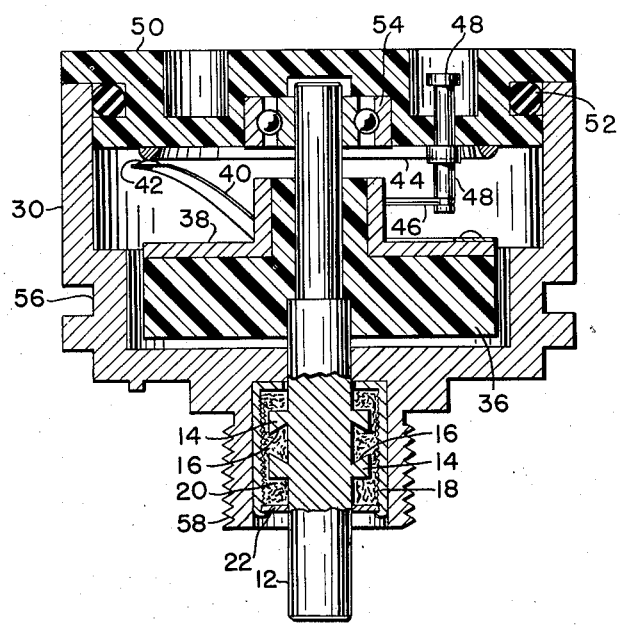
INVENTOR.
ARNOLD S. LOUIS
BY Leonard H. King
AGENT United States Patent Office 2,857,496
Patented Oct. 21, 1958

2,857,496

SEALED POTENTIOMETERS

Arnold S. Louis, Riverdale, N. Y., assignor to
Myron A. Coler, Scarsdale, N. Y.

Application September 27, 1956, Serial No. 612,491

4 Claims. (Cl. 201—55)

This invention relates to improved seals for rotating shafts and particularly to potentiometers sealed against the atmosphere.

In many applications, it is necessary to seal potentiometer elements against environmental conditions in order to protect the mechanism from dust, moisture and/or corrosive agents.

Briefly stated, this invention includes a bearing for a rotary shaft which is formed of a readily deformable low coefficient of friction material which serves as a sealant. The bearing material is maintained under pressure so as to deform the material against the shaft so that it serves as a sealant. The low coefficient of friction of the material permits the utilization of a close tolerance without preventing rotation of the shaft because of shaft "seizure" or binding.

Still other advantages of the invention will become apparent and still others will be pointed out with particularity as the following description proceeds taken in conjunction with the accompanying drawing, which shows in cross-section a rotational potentiometer incorporating the instant invention.

Referring now to the drawing there is shown a highly polished steel shaft 12 having a section provided with disc members 14. The disc members 14 may be observed to include reentrant angle portions 16. A casing member 18 is positioned around the disc members 14. A deformable sealing material 20, having a low coefficient of friction with respect to shaft 12, is molded into the case 18 and around shaft 12. After molding, or optionally, during the molding operation, the cover plate 22 is "press-fit" into the case 18.

The edge of casing 18 may be spun over to tightly seal in the cover plate 22; the deformable sealant 20 is thereby brought into intimate contact with the shaft 12.

If the sealant should expand away from the shaft due to temperature coefficient of expansion, the contact pressure between the sealant 20 and the re-entrant angle portions 16 will increase, thus retaining the seal. The sealant may be a material such as nylon, polytetrafluoroethylene, polymonochlorotrifluoroethylene, polyethylene, or other low coefficient of resistance deformable material. It may be advantageous to fill the deformable material with a solid lubricant such as graphite or molybdenum sulphide.

It is to be understood that the foregoing list is given merely by way of example and is not to be construed as limiting in any sense.

The interior of casing 18 is rendered irregular, as by knurling, so as to provide a keying effect for the purpose of preventing rotation of the sealant 20 with respect to the casing.

The shaft 12 and the casing 18 are in turn force fit into housing 30. A molded plastic rotor 36 is mounted on shaft 12. Since the shaft 12 is prevented from engaging in axial movement, rotor 36 is likewise fixed in position.

Mounted on rotor 36 is a metal take-off cylinder 38, spring 40, and contact 42 which rides against resistance element 44. Spring 46 supported by terminal 48 completes the electrical path from terminal 48 to the variable contact 42. Not shown are the conventional fixed end terminals which are connected to the resistance element 44. The resistance element 44 is supported by back plate 50 which seals into the housing 30 O ring 52. Back plate 50 is shown formed of an insulating material such as a phenolic resin so that terminals may be molded directly therein within requiring the feed-through insulator that would be necessary if the back plate were to be of metal. The shaft 12 is supported in bearing 54 which is press fit into back plate 50. The back plate 50 is fastened to housing 30 by means of recessed flush head screws (not shown).

Housing 30 is provided with annular ring 56 which serves as a so-called "servo mounting." Threaded nipple 58 provides an alternate mounting means.

It is specifically to be noted that the mounting means of this invention avoids the use of friction producing elements such as conventional spring washers or locking rings to prevent end play or axial movement of the shaft. Further, the use of the annular members 14 in combination with cylinder results in a long leakage path and therefore enhanced sealing properties are obtained.

While I have disclosed the best mode presently contemplated for carrying out the invention, I wish it understood that changes may be made without departing from the spirit of the invention.

What is claimed is:

1. A shaft and bushing assembly comprising a shaft provided with a smooth section, a plurality of smooth disc members formed on said smooth section of shaft and extended radially therefrom, a cylindrical shell opened at one end and having a centrally apertured end plate at the other end, said shaft being disposed to pass through said aperture and be rotatable therein, the said shell being concentric with said disc members, a synthetic resin having a low of friction coefficient when molded disposed to fill the space defined by the inner wall of said shell and said end plate and the portion of said shaft formed with said disc members including the area between adjacent discs, a second centrally apertured closure plate for said shell, said second plate being disposed to register closely with said open end of said shell, the said shaft passing through said aperture in said second plate and rotatable therein, said shell and said closure plate defining a housing enclosing said resin and said portion of said shaft formed with said disc members, whereby said resin forms a solid integral member rigidly adhering to said inner portion of said shell and to form a bushing enclosing said disc members and said smooth shaft portion and extending between said disc members in low-friction and in fixed axial relationship.

2. A shaft as in claim 1 wherein said synthetic resin is selected from the group consisting of: nylon, polytetrafluoroethylene, polymonochlorotrifluoroethylene, and polyethylene.

3. A shaft and bushing assembly comprising a shaft, a disc member integral with said shaft and extending radially therefrom, a body of a low coefficient of friction synthetic resin surrounding said disc member and a portion of said shaft affixed to said disc member.

4. The apparatus of claim 3 including means for compressing said resin body against the radially extended faces of said disc member.

References Cited in the file of this patent

UNITED STATES PATENTS

| | | |
|---|---|---|
| 1,481,322 | Kellum | Jan. 22, 1924 |
| 1,771,794 | King | July 29, 1930 |
| 2,204,253 | MacCreedy | June 11, 1940 |
| 2,400,099 | Brubaker et al. | May 14, 1946 |